United States Patent
Palumbo et al.

(10) Patent No.: US 10,127,382 B2
(45) Date of Patent: Nov. 13, 2018

(54) MALWARE DETECTION METHOD

(71) Applicant: F-Secure Corporation, Helsinki (FI)

(72) Inventors: Paolo Palumbo, Helsinki (FI); Dmitry Komashinskiy, Helsinki (FI); Juha Ylipekkala, Helsinki (FI); Jarno Niemela, Kirkkonumm (FI)

(73) Assignee: F-Secure Corporation, Helsinki (FI)

( * ) Notice: Subject to any disclaimer, the term of this patent is extended or adjusted under 35 U.S.C. 154(b) by 75 days.

(21) Appl. No.: 14/886,248

(22) Filed: Oct. 19, 2015

(65) Prior Publication Data

US 2016/0112444 A1   Apr. 21, 2016

(30) Foreign Application Priority Data

Oct. 17, 2014  (GB) .................................. 1418499.8

(51) Int. Cl.
   *G06F 21/56*   (2013.01)
   *H04L 29/06*   (2006.01)

(52) U.S. Cl.
   CPC ............ *G06F 21/567* (2013.01); *G06F 21/56* (2013.01); *H04L 63/145* (2013.01)

(58) Field of Classification Search
   CPC ........................................................ G06F 21/56
   See application file for complete search history.

(56) References Cited

U.S. PATENT DOCUMENTS

| | | | | |
|---|---|---|---|---|
| 7,231,637 | B1 * | 6/2007 | McEwan ................. | G06F 21/56 717/171 |
| 7,523,487 | B2 * | 4/2009 | Muhlestein ........... | G06F 21/562 713/155 |
| 8,813,222 | B1 * | 8/2014 | Codreanu ............... | G06F 21/56 726/22 |
| 2005/0132206 | A1 | 6/2005 | Palliyil et al. ................ | 713/188 |
| 2005/0137980 | A1 * | 6/2005 | Bullock ................ | G06F 21/564 705/44 |
| 2006/0278694 | A1 * | 12/2006 | Jha .......................... | G06F 21/51 235/379 |
| 2010/0011029 | A1 * | 1/2010 | Niemela ................. | G06F 21/55 707/E17.044 |
| 2010/0100963 | A1 | 4/2010 | Mahaffey ........................ | 726/25 |

(Continued)

FOREIGN PATENT DOCUMENTS

| | | |
|---|---|---|
| EP | 2 793 160 A1 | 10/2014 |
| GB | 2 469 322 A | 10/2010 |

(Continued)

*Primary Examiner* — Jason Chiang
(74) *Attorney, Agent, or Firm* — Harrington & Smith (57) ABSTRACT

A method of detecting malware on a client computer, the method including generating a hash of an entity at the client computer, whereby the entity is suspected to be malware, sending the hash to a network server, considering the reputation of the hash at the network server by comparing the hash to a database of hashes of known reputation, returning the results of said considering to the client computer, and, if the reputation is not known at the server, sending instructions to the client computer for obtaining further information about the entity at the client computer, wherein said further information is obtained by executing code at the client computer sent by the server to the client computer after said considering the reputation if said code is not stored at the client computer before said generating a hash.

14 Claims, 5 Drawing Sheets

(56) References Cited

U.S. PATENT DOCUMENTS

| | | | | |
|---|---|---|---|---|
| 2010/0169972 A1* | 7/2010 | Kuo | ............... | H04L 63/145 |
| | | | | 726/23 |
| 2012/0117648 A1* | 5/2012 | Kallio | ............... | G06F 21/564 |
| | | | | 726/23 |
| 2012/0216283 A1* | 8/2012 | Endler | ............... | G06F 21/575 |
| | | | | 726/24 |
| 2013/0219493 A1* | 8/2013 | Banzhof | ............... | H04L 63/1433 |
| | | | | 726/22 |
| 2013/0254880 A1* | 9/2013 | Alperovitch | ............... | G06F 21/51 |
| | | | | 726/22 |
| 2014/0189859 A1* | 7/2014 | Ramanan | ............... | G06F 21/56 |
| | | | | 726/22 |
| 2015/0317479 A1* | 11/2015 | Jiang | ............... | G06F 21/56 |
| | | | | 726/23 |

FOREIGN PATENT DOCUMENTS

| | | | | |
|---|---|---|---|---|
| GB | 2 518 636 A | | 4/2015 | |
| WO | WO201482599 | * | 6/2014 | ............. G06F 21/56 |

* cited by examiner

MALWARE DETECTION METHOD

TECHNICAL FIELD

The present invention relates to detection of malware on a computer system.

BACKGROUND

The term "malware" is short for malicious software and is used to refer to any software designed to infiltrate or damage a computer system without the owner's informed consent. Malware can include viruses, worms, Trojan horses, rootkits, adware, spyware and any other malicious and unwanted software. Many computer devices, such as desktop personal computers (PCs), laptops, personal data assistants (PDAs) and mobile phones can be at risk from malware. Computer systems running the Windows™ operating system are particularly at risk from malware, but all operating systems will be at some risk. Examples of other operating systems that could be at risk are Mac OS™, Linux™, Android™, iOS™, Windows Mobile™, and Blackberry OS™.

The current threat landscape shows a continuous increase in the number of malicious applications that are threatening the security of internet users. Combating these malicious applications is challenging due to the ability of malware authors to produce unique variations of their creations that are then distributed to victims through a variety of infection paths. The variations of the malware creations make it difficult for anti-malware to detect the malware by simply recognising it based on an earlier version of the malware stored in a database.

Anti-malware products traditionally rely on local scanning technologies or on full-file hash network queries. Local technologies are installed on the equipment of a user and include signature-based detection and heuristic detection. Signature-based detection is based on searching for known patterns of data within executable code, while heuristic detection is based on searching for mutations or refinements of known malware. Signature-based detection and heuristic detection rely on database updates for their knowledge of known malware and the database needs to be up-to-date at all times to maximise the efficiency of these methods. How generic the signature or heuristic detection schemes are affects the ability of the anti-malware product to provide protection to the user equipment.

Network-based full-file hash queries first apply a transform such as a cryptographic hash function to a malware program in order to obtain a hash value, which forms a unique representation of the malware program. The hash value is then used to identify the malware at the network by comparing the value against values in a database. Examples of transforms for generating hash values are MD5 and SHA-1. With this technique, the cryptographic hash of each scanned item is used to determine whether the item has been seen before, and, in such case, its reputation. This approach does not require a local database, but cannot aim to provide a generic level of protection due to the very nature of cryptographic hash methods because a very minor change in the malware will result in a completely different hash value.

Current anti-malware products rely mostly on a combination of local scanning techniques and network based hash look-ups. These mechanisms have each their problems, namely the former is heavily dependent of its database to provide a level of generic protection, while the latter lacks generality.

SUMMARY OF THE INVENTION

According to a first aspect, there is provided a method of detecting malware on a client computer, the method comprising: generating a hash of an entity at the client computer, whereby the entity is suspected to be malware, sending the hash to a network server, considering the reputation of the hash at the network server by comparing the hash to a database of hashes of known reputation, returning the results of said considering to the client computer, and, if the reputation is not known at the server, sending instructions to the client computer for obtaining further information about the entity at the client computer, wherein said further information is obtained by executing code at the client computer sent by the server to the client computer after said considering the reputation if said code is not stored at the client computer before said generating a hash.

The method may further comprise executing further code at the client computer for obtaining said further information, whereby said further code is stored on the client computer before said generating a hash. The hash may be sent to the server over a first interface, the further information may be sent to the server over a second interface and said code may be received from the server over a third interface.

The method may further comprise forwarding said further information to a human operator for making a decision on the reputation of the entity. Optionally, the method further comprises storing the code on a database at the client computer and/or storing the further information on a database at the server for sharing a reputation of the entity with other client computers. The method may further comprise deciding at the server whether the entity is malware based on said further information.

According to a second aspect, there is provided a method of detecting malware on a client computer, the method comprising, at the client computer, generating a hash of an entity, whereby the entity is suspected to be malware, sending the hash to a network server, receiving a response from the network server on the reputation of the hash, and, if the reputation is not known at the server, receiving instructions for obtaining further information about the entity, wherein said further information is obtained by executing code at the client computer received from the server after said sending the hash to a network server.

The method according to the second aspect may further comprise executing further code at the client computer for obtaining said further information, whereby said further code is stored on the client computer before said generating a hash. The hash may be sent to the server over a first interface, said further information may be sent to the server over a second interface and said code may be received from the server over a third interface.

According to a third aspect, there is provided a method of detecting malware on a client computer, the method comprising: at the server receiving a hash of an entity, whereby the entity is suspected to be malware, considering the reputation of the hash by comparing the hash to a database of hashes of known reputation, returning the results of said considering to the client computer, and, if the reputation is not known at the server, sending instructions to the client computer for obtaining further information about the entity at the client computer, providing code to the client computer for obtaining further information. The hash may be received over a first interface, the further information may be received over a second interface and said code may be received from the server over a third interface.

The method of the third aspect may further comprise forwarding said further information to a human operator for making a decision on the reputation of the entity and/or storing the further information on a database for sharing a reputation of the entity with other client computers. The method may further comprise deciding whether the entity is malware based on said further information.

According to a fourth aspect, there is provided a client computer comprising: a transceiver for sending a hash of an entity to a server and receiving a request for further information from the server; a module for executing code received from the server for obtaining further information from the entity; a database for storing said code; wherein the transceiver is further for sending said further information to the server.

According to a fifth aspect, there is provided a server comprising: a transceiver for receiving a hash of an entity from a client computer; a database of hashes of known entities; a module for determining the reputation of the hash by comparing the hash to the database of hashes and for determining if the file is malicious using the results of the comparison; a database of code for providing the client computer with code for obtaining further information about the entity; a malware analysis module for analysing the further information in order to determine if the entity is malware.

The malware analysis module of the server according to the fifth aspect may comprise a first portion for analysing further information obtained by executing code present at the client computer before the hash of the entity is calculated; and a second portion for analysing further information obtained by executing code provided by the server after the hash of the entity is calculated.

According to a sixth aspect, there is provided a computer program comprising computer readable code, which, when run on a computer, causes it to act as a client computer according to the fourth aspect or a server according to the fifth aspect.

According to a seventh aspect, there is provided a computer program product comprising a non-transitory computer readable medium and a computer program according to the sixth aspect, wherein the computer program is stored on the computer readable medium.

DETAILED DESCRIPTION

As discussed above, the inventors have appreciated that local scanning techniques are limited by their dependence on a database and database updates, while network-based hash look-ups are very specific.

Herein disclosed is a method of generating a hash of an entity at the user equipment, whereby the entity is suspected to be malware, sending the hash to a network server, considering the reputation of the hash at the network server and returning the results of said considering to the user equipment. If the reputation is not known at the server, instructions are sent to the user equipment for obtaining further information about the entity. In particular, the further information can be obtained by executing a subroutine or a well identified portion of the code at the user equipment. The further information is sent back to the server for further consideration and, if the results of the consideration are inconclusive, the steps of obtaining further information from the user equipment and considering that further information at the server are repeated until a decision can be made whether the entity is malware or not.

This method may have the advantage of combining the aspect of generality of local detection scanning techniques with the freedom of avoiding a possibly out-of-date local database by network lookup techniques. When a suspected malware entity is first seen at a user equipment, the method initiates an iterative interaction between the user equipment and the server aimed at determining whether the sample is malicious or not. In each part of this iterative method, the method extracts information from the entity that is being scanned and uploads such information to the servers. Based on an analysis of such information in combination with other data available at the server, the server provides an answer to the client about the reputation of the item.

The further information which can be requested by the server, if the initial hash is not recognised at the server, can be obtained by using a primitive. A primitive can be a subroutine or a well identified portion of code with a well-defined and self-contained purpose. Three types of primitives are distinguished herein: root primitives, local primitives and remote primitives, which are discussed in more detail below.

Root primitives are a set of primitives available to the client at the start of the method that allow harvesting initial data about the entity. These root primitives determine the initial information which is extracted from the entity by the client and how this information is prepared to be sent to the server, and subsequently sent to the server so that the server can try to determine whether the entity is malicious.

Local primitives are a set of primitives available to the client that allow interaction with the entity being scanned. For example, a string search operation inside the entity currently being scanned could be considered a "local primitive".

A root primitive is a specific example of a local primitive, and the root primitive is arranged to run automatically on a scanned entity if the initial hash-based check fails and there is no clear trustworthy reputation or safety status available at the server for that particular hash. Each file type has its own unique root primitive arranged to extract basic data about its structure, origin and/or behaviour. The function of root primitives is to prepare analysed object's layout in order to provide its initial representation for a server and, if necessary, to trigger further steps of analysis.

Remote primitives are used if the set of functionalities available by default at the client is not capable of extracting the information from the entity which is sufficient to reach a conclusion on whether the entity is malware or not. The remote primitives can be obtained from the network server. The remote primitives can be deployed at local devices such as the client computer after obtaining them from the network server.

By way of example, activities associated with a possible set of primitives specific for APK (Android Package) may be as follows. Activities triggered by running the root primitive may be: unpack the file object, calculate full file hashes for embedded file objects, extract visible strings from specific embedded file objects (like *.DEX and *.SO files) and parse embedded binary XML file objects; form a resulting output structure and serialize it.

Activities triggered by running the local primitive are: a string (regular expression) search in an embedded file object specified by a server; a hash calculation for a part of an embedded file object specified by a server; upload an embedded file object specified by a server for further analysis.

For the remote primitive, an activity may be a case specific calculation which is to be performed on the case specific items, for instance, an entropy calculation.

A client is a term used to indicate an application running on a user equipment. This application is able to monitor, interpret and analyse events at the operating system. If it is necessary, the client contacts the server according to the method disclosed herein. In the context of the method disclosed herein, the client is to be considered an executor of instructions received from the server; it is up to the client to perform, based on its set of primitives, possibly heavy computations.

The server is provided by one or more interconnected computers that are tasked with interacting with the clients by way of a number of different interfaces. The server receives the requests and data from clients, analyses them and makes the result of these analysis available to all of the clients. To enable the interaction with its clients, the server provides the following three distinct network-based services, replicated as many times as needed to serve its clients: an object reputation service, a data upload service and a code distribution service, which are discussed in more detail below.

Object Reputation Service (ORS): The client interacts with this reputation service to establish an initial full file hash lookup at the server. Moreover, the service can return not only the reputation of the hash, but also a set of instructions that is intended to increase the information available at the server-side regarding the item.

Data Upload Service (DUS): The results of the client's computations in response to the request from the server for more information are uploaded through this service to make a reputation of the entity available at the server to other applications and other clients once the reputation has been established and, optionally, instructions for which action to take with respect to the entity. Other clients will be able to access those results, such that they will be aware of any new malware which was previously not known.

Code Distribution Service (CDS): this service is responsible for delivering the right remote primitive to those clients that need them. This service is used if the client does not have the required local primitive.

Figure 1:
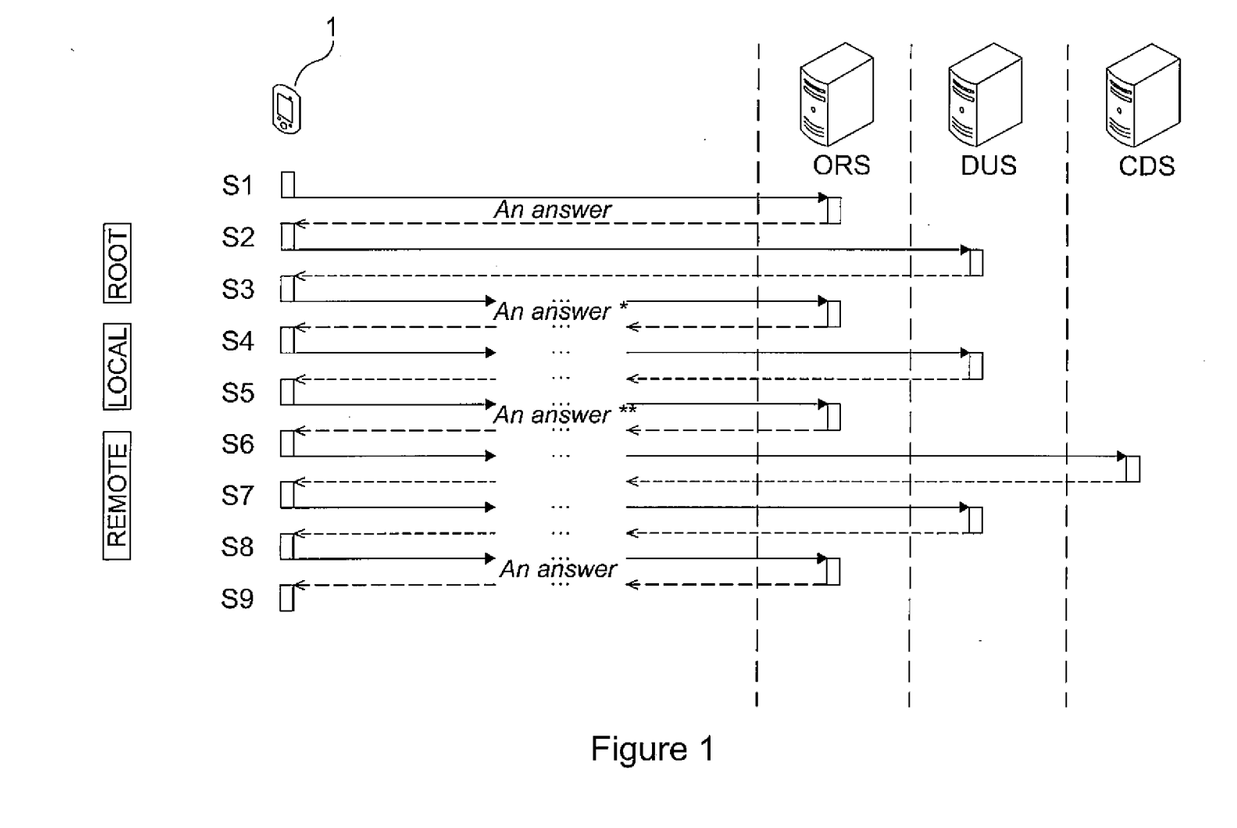
FIG. 1 is a signalling diagram between a client and a server.

A specific embodiment is now described with reference to FIG. 1. For this example, the client is running on a mobile device (1), but the concept expressed in this invention is independent from the particular kind of device. The three interfaces, ORS, DUS and CDS provided by the server are illustrated in their interaction with the client. In such interaction, the client first notices an event requiring its attention. For example, the client receives the notification that the operating system is required to install a new application. If the mobile device is an Android-based device, for example, then the client will focus its attention towards the APK file that is being installed.

The client calculates the cryptographic hash of the item (S1). For example, algorithms such as SHA1 or MD5 mentioned above can be used for calculating a hash of the full file content, but more generic forms of cryptographic hashes may also be used. The calculated hash is sent to the ORS and looked up on the ORS. If the hash corresponds to the contents of an item that has not yet been seen or analysed, the ORS will return an answer of type c (continue).

This answer will prompt the client to execute the root primitives (S2) corresponding to the specific object type, in this example, APK. The result of the root primitive is delivered to Server via the DUS. The DUS will receive the uploaded content and store it. This information is used by the Server to determine a category or reputation for the item to which the uploaded data corresponds. The output of the analysis performed by the server is then propagated to the ORS, so that all of the clients can benefit from these results. If the server is not able to conclusively determine a category or reputation, the ORS will receive instructions for the clients on how to proceed in the case they would encounter an item with the same content.

At this point, the client performs another lookup operation at the server to see what the result of the analysis is (S3). In situations where the speed of the analysis cannot be guaranteed, a timeout between upload and lookup may be inserted. The client will use the value returned by the lookup either to take a final action regarding item, for example 'the file is malicious, delete it', or it will execute the instructions that the Server has prepared regarding the item (S4 and S5). These instructions might include, for example, a specific primitive that the client needs to execute, along with its possible arguments. The set of primitives that is available to the client includes the local primitives and root primitives.

This iterative process continues until a final decision regarding the item is made or until the server requests the use of a primitive that is not in the set of root or local primitives available to the client. In such situation (S6), the client will use the information prepared by the server to retrieve the missing primitive from CDS, then execute it with the provided arguments. The result of the execution of the remote primitives (S7) is shared with the DUS (38). The client implements validation, which makes sure that the primitive is valid and trustworthy, and caching, i.e. storing locally, of remote primitives. The remote primitive becomes local at this stage and can be used again in later applications. The ORS makes a decision about the reputation of the item (S9) available to the client.

Figure 2:
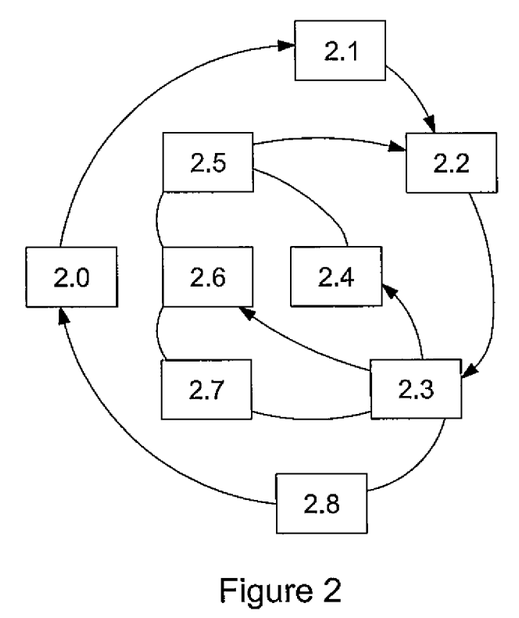
FIG. 2 illustrates the states of the client.

FIG. 2 illustrates the different states of the client and the transitions between the states. The states are: idle state (2.0); full object hash calculation (2.1); query object's status (2.2); wait for response (2.3); collect data via a root primitive (2.4); upstream collected results (2.5); collect data via an extra call using local or remote primitives (2.6); download remote primitives (2.7) and perform recommended activity (2.8). The following transitions between these states can take place: an object of interest has arisen (2.0-2.1); an object's unique identifier has been calculated (2.1-2.2); an object's status query has been sent (2.2-2.3); a continue response has been received (from 2.3 to 3.4, 3.6 or 3.7); collecting data via root primitive has been completed (2.4-2.5); upstreaming data has been completed (2.5-2.2); collecting data via an extra call primitive has been completed (2.6-2.5); downloading remote primitives has been completed (2.7-2.6); recommended activities have been fulfilled (2.8-2.0).

Figure 3:
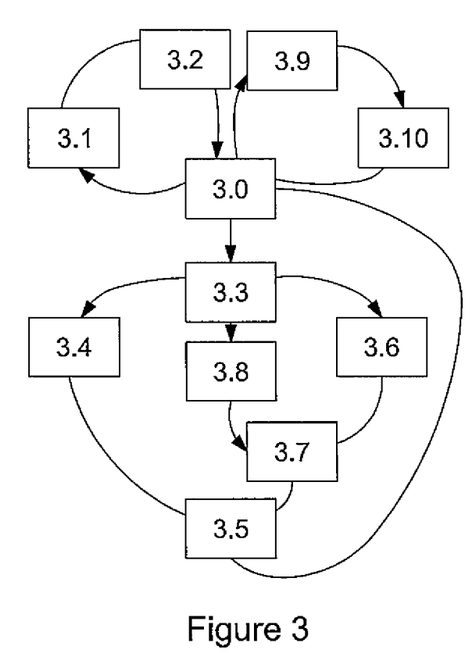
FIG. 3 illustrates the states of the server.

FIG. 3 illustrates the following states of the server: idle state (3.0); querying hash-response database (3.1); sending response for the queried hash (3.2); interpreting received data which are uploaded by the client (3.3); analysing initial description provided by a root primitive (3.4); updating hash-response database (3.5); analysing extra description provided by local primitives (3.6); updating remote primitives database (3.7); analysing extra description provided by remote primitives (3.8); querying remote primitives database (3.9); sending queried remote primitive (3.10). The following transitions between these states of the server can take place: status query has been received (3.0-3.1); download query has been received (3.0-3.9); upload query has been received (3.0:3.3); an answer from the hash-response database has been extracted (3.1-3.2); a response has been sent (3.2-3.0); the data includes an initial description provided by a root primitive (3.3-3.4); the data includes an initial description provided by a local primitive (3.3-3.6); the data includes an extra description provided be a remote primitive (3.3-3.8); the initial description's analysis has been done (3.4-3.5); a hash-response database's update has been done (3.5-3.0); an extra description's analysis has been done (3.6-6.7); a remote primitive's database's update has been done (3.7-3.5); an extra description's analysis has been done (3.8-3.7); an answer from remote primitives' database has been extracted (3.9-3.10); a remote primitive has been sent (3.10-3.0).

Figure 4:
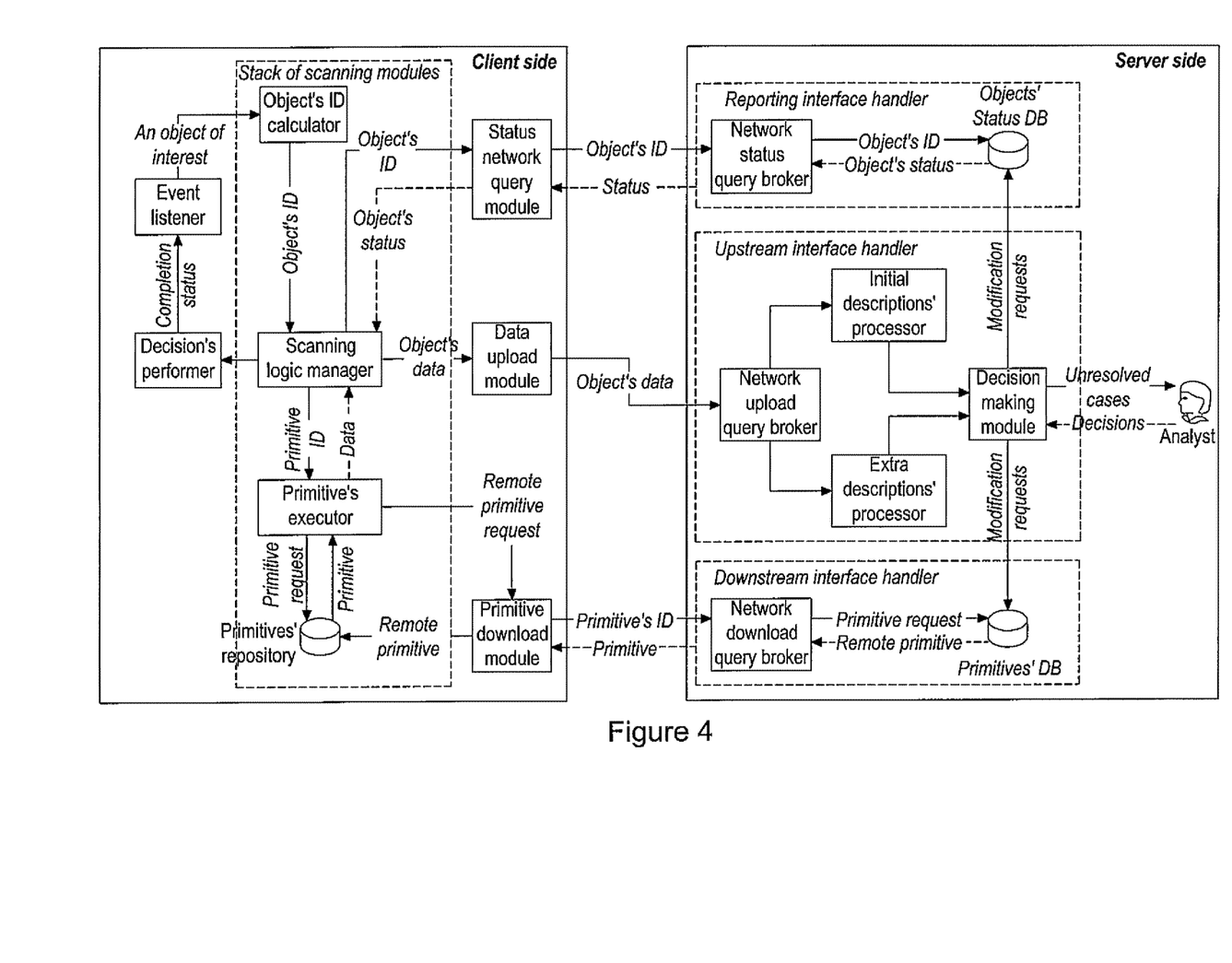
FIG. 4 is a diagram of a system architecture.

FIG. 4 shows the basic architecture of a possible implementation of the described method. The left side of the diagram describes the client-side component, while the right part of the diagram describes a server-side component. The two sides of the diagram are connected via three different interfaces, whereby each of the connections describes one of the possible types of communications between the client and the server: at the top is a lookup connection with ORS; the middle connection is the connection used to upload data to the DUS; the lower connection is dedicated to downloading any required remote primitives from the CDS.

At the server side, these three connections are handled by "Reporting interface handler" for the ORS, "Upstream interface handler" for the DUS and "Downstream interface handler" for the CDS. At the client side, these communications are handled via "Status network query module" for the ORS client-side component, "Data uploading module" for the DUS client-side component and "Primitive downloading module" for the CDS client-side component.

On the client side, there is a "Stack of scanning modules" that receives an object to scan from an 'event listener' that interacts with the specific operating system. The "Stack of scanning modules" is responsible for providing a decision for the "Decision performer". Examples of decisions are block, allow, rescan later, etc. and these decisions are specific to the product implementing the system. While analysing the selected object, the "Stack of scanning modules" uses the facilities provided by the server via the provided network interfaces (ORS, DUS and CDS).

When an object is received by "Stack of scanning modules", its ID is calculated, for example by calculating a full file cryptographic hash, at the object's ID calculator. This ID and the object itself are then passed to the "Scanning logic manager", which uses the capabilities of the server and the primitives available locally to determine a verdict. The "Scanning logic manager" works accordingly the activity diagram presented at FIG. 1. The specific behaviour of client and server in this interaction process are illustrated in detail by FIG. 2 and FIG. 3. The primitives are managed via a locally stored "Primitive repository", which may be updated through a contribution from the server via the CDS interface. The Scanning logic manager interacts with the Primitives repository via a Primitive's executor.

On the server side, each subcomponent responds to specific client actions. The "Reporting interface handler" retrieves the current status of the object with the specific ID and sends it back to the client, possibly together with additional instructions. The Reporting interface handler includes a Network status query broker and an Objects' status DB. The "Downstream interface handler" provides the specific primitive that the client is requesting and includes a Network download query broker and a Primitives' database.

"Upstream interface handler" is responsible for receiving data from the client, storing it and analyzing it. Analysis of data provided by "root primitives" at the beginning of the object's analysis is performed by "Initial description processor"; results from "local primitives" and "remote primitives" are instead analysed by the "Extra description processor". The reason for which these two are kept separate in the diagram is to highlight the fact that root primitives are very commonly received and require a well-defined type of analysis, while data from local primitives and remote primitives is much rarer and requires a different analysis that takes advantage of the context. The results of the analysis go to the "Decision making module", which in turn updates the "Object status DB" entry for the particular ID and also the Primitives' database.

In those cases where the analysis cannot automatically resolve the case, a human actor ("analyst") is alerted. He or she analyses available data, resolves the uncertainty based on his or her experience and expertise and provides a verdict, additional decision logic and if needed adds one or more remote primitives.

Figure 5:
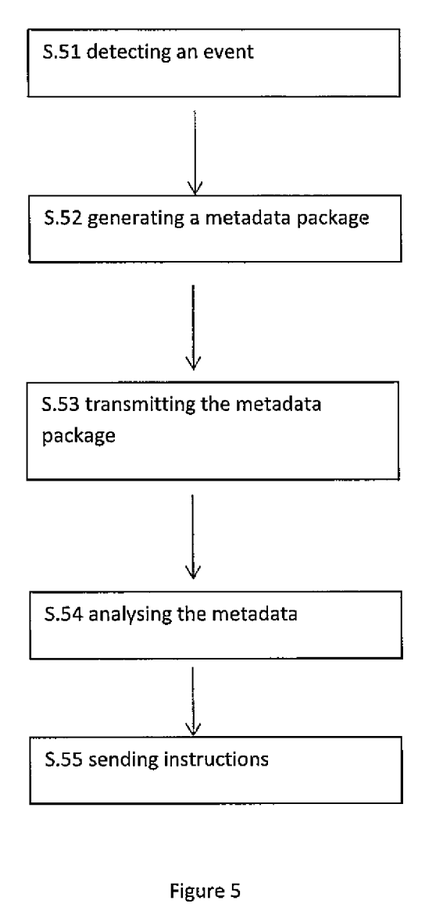
FIG. 5 is a flow diagram.

A further embodiment includes a node A and a node B. Node A is typically a customer device and node B a security cloud. Node A has an agent which is arranged to connect to node B over a network. The agent may be software installed on node A. As illustrated in FIG. 5, the agent on node A is arranged to detect an event (S51) related to a file which may not have been known previously to the agent on node A, whereby the file was downloaded or otherwise generated. The agent then generates a metadata package (S52) of said file and transmits it to node B (S53). Node B then analyses the metadata (S54) and returns instructions (S55) on how to proceed to the agent on node A. The instructions may include requests to monitor any subsequent events related to the new file and to generate a system skeleton for uploading it to node B for further analysis. A system skeleton provides information about a chain of events that are associated with each other in node A.

The agent on node A can use event monitoring or controlled execution to collect events related to the file before, or after node B has instructed node A to do so. The skeleton can include a trace of one or more executed processes, file system locations of the processes, file names and hashes of the files which are in same directories as any of the processes in the skeleton, registry entries which are associated with the processes either by location or modification time in registry, their memory and file contents. A trace can include a log of specified system calls, data input and output and other activities. A skeleton can also include system artefacts that have been known to show an indication of a compromise. All parts of the system skeleton can be controlled by the service on node B based on information provided by the agent of node A.

Node B has prevalence information of events provided by several nodes and node B can deduce whether the events provided by Node A are normal or abnormal based on this information. For example, it is normal that a Firefox or Chrome process writes executable files to its own installation directory, which is what happens when the web browser updates itself. But it is not normal that the written file has a filename that is not used by any other instance of the web browser except for the one running in Node A. The result of the analysis is then returned to the agent on node A After establishing the reputation of an entity on a computer, such as node A, the computer can be instructed to take action if the entity is established to be malware. For example, the entity can be quarantined or deleted.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method of detecting malware on a client computer, the method comprising:
   (a) generating a hash of an entity at the client computer, whereby the entity is suspected to be malware;
   (b) sending the hash to a network server;
   (c) considering a reputation of the hash at the network server by comparing the hash to a database of hashes of known reputation;
   (d) returning results of said considering to the client computer, and, if the reputation is not known at the server, sending instructions to the client computer for obtaining further information about the entity at the client computer;
   (e) obtaining said further information by executing code at the client computer already present at the client computer or sent to the client computer by the server after said considering the reputation if said code is not stored at the client computer before said generating a hash;
   (f) sending the further information to the server from the client computer;
   (g) analysing, at the server, the further information obtained from the client computer to determine whether a reputation can be established for the hash and, if so, storing the reputation in the database;
   (h) waiting for a pre-defined length of time at the client computer for the analysis by the server to be completed before re-executing the method from step (b), wherein said waiting for a pre-defined length of time is performed by the client device inserting a timeout between steps (f) and (h), and wherein steps b to d are repeated until an indication of the completed analysis at the server is received by the client computer at the server; and
   at the server, forwarding said further information to a human operator for making a decision on the reputation of the entity.

2. The method of claim 1, further comprising executing further code at the client computer for obtaining said further information, whereby said further code is stored on the client computer before said generating a hash.

3. The method of claim 1, wherein the hash is sent to the server over a first interface.

4. The method of claim 1, wherein said further information is sent to the server over a second interface.

5. The method of claim 1, wherein said code is received from the server over a third interface.

6. The method of claim 1, further comprising storing the code on a database at the client computer.

7. The method of claim 1, further comprising storing the further information on a database at the server for sharing a reputation of the entity with other client computers.

8. A client computer comprising:
   a computer program product comprising a non-transitory computer readable medium including computer readable code which, when executed on a computer, causes the client computer to:
   (a) generate a hash of an entity at the client computer, whereby the entity is suspected to be malware;
   (b) send the hash to a network server;
   (c) consider a reputation of the hash at the network server by comparing the hash to a database of hashes of known reputation;
   (d) return results of said considering to the client computer, and, if the reputation is not known at the server, sending instructions to the client computer for obtaining further information about the entity at the client computer;
   (e) obtain said further information by executing code at the client computer already present at the client computer or sent to the client computer by the server after said considering the reputation if said code is not stored at the client computer before said generating a hash;
   (f) send the further information to the server from the client computer;
   (g) analysis, at the server, the further information obtained from the client computer to determine whether a reputation can be established for the hash and, if so, storing the reputation in the database;
   (h) wait for a pre-defined length of time at the client computer for the analysis by the server to be completed before re-executing the method from step (b), wherein said waiting for a pre-defined length of time is performed by the client device inserting a timeout between steps (f) and (h), and wherein steps b to d are repeated until an indication of the completed analysis at the server is received by the client computer; and
   forward, at the server, said further information to a human operator for making a decision on the reputation of the entity.

9. The client computer of claim 8, comprising executing further computer readable code at the client computer to cause the client computer to obtain said further information, whereby said further code is stored on the client computer before said generating a hash.

10. The client computer of claim 8, wherein the hash is sent to the server over a first interface.

11. The client computer of claim 8, wherein said further information is sent to the server over a second interface.

12. The client computer of claim 8, wherein said code is received from the server over a third interface.

13. The client computer of claim 8, further comprising the client computer is caused to store the code on a database at the client computer.

14. The client computer of claim 8, further comprising the client computer is caused to store the further information on a database at the server for sharing a reputation of the entity with other client computers.

* * * * *